United States Patent [19]

Quilliam

[11] 4,368,463
[45] Jan. 11, 1983

[54] GRAPHIC DISPLAY AREA CLASSIFICATION

[75] Inventor: John E. H. Quilliam, Surrey, England

[73] Assignees: Sigma Electronics Limited, Horsham; The University of Surrey, Guilford, both of England

[21] Appl. No.: 131,676

[22] Filed: Mar. 19, 1980

[30] Foreign Application Priority Data

Mar. 21, 1979 [GB] United Kingdom ................. 7910004

[51] Int. Cl.$^3$ ............................................. G06K 9/20
[52] U.S. Cl. .................................... 340/744; 340/720
[58] Field of Search ............... 340/700, 732, 744, 756, 340/720

[56] References Cited

U.S. PATENT DOCUMENTS 3,701,988 10/1972 Allaart .............................. 340/744
3,902,160 8/1975 Kawa .
3,967,241 6/1976 Kawa .
4,205,389 5/1980 Heartz .............................. 340/744

FOREIGN PATENT DOCUMENTS 7717468 12/1978 France .
1405882 9/1975 United Kingdom .

OTHER PUBLICATIONS

Article "A Parallel Picture Processing Machine" by Bjorn Kruse from IEEE Transactions on Computers, vol. C-22, No. 12, Dec. 1973, pp. 1075-1087.
Article "Taschenbuch der Informatik" by K. Steinbuch and W. Weber, Spring-Verlag, 1974, pp. 466-479.
"Digital Pattern Recognition", Edited by K. S. Fu, Spring-Verlag, 1976, pp. 162-163.

Primary Examiner—Alvin H. Waring
Attorney, Agent, or Firm—Berman, Aisenberg & Platt

[57] ABSTRACT

A method and apparatus are provided for classifying areas on a raster-type display unit. The problem is to identify areas defined by a closed boundary—e.g. for filling in such areas. Boundary data are entered into a first "polygon" store which has a plurality of memory locations each corresponding to a respective dot position of the display field, and at least one seed point is identified. Each dot position is then examined to see whether there exists a connected path, not including a boundary position, from it to a seed point, and if there is, this fact is recorded. The criterion for deciding whether or not a path is connected depends on the definition of what constitutes a closed boundary.

14 Claims, 8 Drawing Figures

GRAPHIC DISPLAY AREA CLASSIFICATION

The invention relates to methods and apparatus for classifying areas.

According to one aspect of the invention, there is provided a raster-scan display apparatus comprising: first store means having a plurality of memory locations for storing data representing respective dot portions of a display field; means operable to store in said store data representing boundary dot portions; second store means having a plurality of memory locations for storing data representing respective dot portions of the display field; means operable to define one or more notional dot portions in or adjacent the field as representing a seed point or points; and classifying means arranged in operation for each dot position of the display field, to determine whether there exists, from that dot position to the or a seed point, a connected path (as herein defined) of dot positions which does not include a dot position which is indicated by the corresponding location in said first store means as being a boundary dot position and, if such a path exists, to set the corresponding location in the second store means.

In another aspect, the invention provides a method for classifying areas defined by a boundary in a display field of a raster-type display, comprising defining a boundary by means of a plurality of boundary dot positions; identifying at least one seed point; determining, for each dot position of the display field whether there exists, from that position to the or a said seed point, a connected path of dot positions not including a boundary dot position, and if such a path exists recording the position of the dot.

The dot positions will normally be considered to be rectangular, in which case it is necessary to consider the question of connectivity—i.e. the criteria to be used in deciding whether a boundary is closed, and whether a path is connected. FIG. 1 shows schematically nine dot positions 1 to 9. Position 5 may be regarded as "connected" either to all other dot positions which it touches (i.e. positions 1,2,3,4, 6,7,8 and 9) or only to all other dot positions with which it shares an edge (i.e. positions 2,4,6 and 8). If, in considering whether a succession of dot positions (i.e. a path) from one dot position to another is "connected", one considers any pair of positions which touch as being "connected", then the path will in general be what is called an eight-connected path, since any dot is connected to eight other potential members of the path. If however, one considers only those pairs of positions which share an edge as being connected, then the path can only be a four-connected path since each dot position is connected to only four others. It should be observed that all four-connected paths are ipso facto, eight-connected.

It will thus be appreciated that the criterion for determining whether a path is connected depends on the convention adopted as to what constitutes a closed boundary.

If any eight-connected boundary is regarded as closed, then a path is deemed to be connected only if it is four-connected, whereas if a boundary is to be considered closed only if it is four-connected, then any eight-connected path is deemed to be connected.

Of course, if said dot positions were, for example, regarded as being hexagonal, all paths could be six-connected including boundary paths.

The preferred method, when used with an endless boundary, operates with a seed point external of the boundary.

Preferably, those dot positions external of the boundary are first identified whereby those dot positions within the boundary may be calculated by subtraction.

Preferably, a plurality of seed points are used.

Said plurality of seed points are preferably external of the display and form a notional continuous boundary external of the actual dot positions. This enables a boundary of arbitrary shape and position on a matrix of dot positions to be accommodated by the method.

Once all the dot positions within the boundary are identified, (whether by first identifying those dot positions external of the boundary or otherwise) these internal dot positions may be "filled in" on the display e.g. given a colour different from the dot positions external of the boundary. Thus the method provides a way of filling areas on a raster-type display.

In a preferred arrangement, rather than carrying out, for every dot position, a complete search for connected paths to the seed point, said determination comprises carrying out a scan of the field in which, each dot position of the field is recorded as being linked by a connected path to a seed point only if the position in question (a) is not a boundary point and (b) is adjacent to, and connected to a seed point or to another point in respect of which such a path has already been recorded as existing, and carrying out further such scans until a scan has taken place in which no further paths have been recorded. In this way, during repeated scans, the paths propagate progressively outward from the seed point.

Where any eight-connected boundary is defined as closed, and a path is defined as connected only if four-connected, it may be arranged that each scan is carried out in two parts wherein, in each part of the scan, the positions of the field are scanned in turn in a raster-like manner and each dot position is recorded as being so linked only if condition (b) is satisfied in respect of those seed or other points which, in the relevant scan directions, precede the point in question, the sense of scan in both directions being reversed during the second part of the scan.

It may be noted (as will become clear from the description below) that there are two possible alternatives for the reverse scan: one in which the path of the first part of the scan is retraced, and one in which the lines of the reverse part of the scan cross those of the first part.

In a preferred embodiment of the apparatus it is provided that the classifying means comprises addressing means including address counters and arranged in operation during each part of the scan, to read out sequentially in a raster-like manner, data in respect of each dot position, said data comprising:
  (a) boundary data consisting of the contents of the corresponding location in the first store means;
  (b) fill data consisting of the contents of the corresponding location in the second store means;
  (c) previous line fill data consisting of the contents of the location in the second store corresponding to the corresponding dot position of the previous line (if any) of the current part of the scan;
  (d) previous dot fill data consisting of the contents of the location in the second store means corresponding to the previous dot position (if any) of the current scan line;

in which the classifying means further comprises logic means responsive to said data to write into the location in the second store means corresponding to the current dot position data representing the set state only if (a) the boundary data indicates the absence of a boundary point and (b) either (i) any one of the fill data, previous line fill data (if any) and previous dot fill data (if any) indicates the set state or (ii)—where the means for defining the seed point(s) operates to supply a seed signal whenever the current dot positions is (in the current scan direction) the first position of the current line or on the first line of the field—the automatic seed signal is present, and in which the classifying means further comprises bistable means the state of which is changed at the conclusion of each part of the scan and which controls the count direction of the address counters.

For a better understanding of the invention, reference will now be made, by way of example, to the accompanying drawings, in which.

Figures 1, 2:
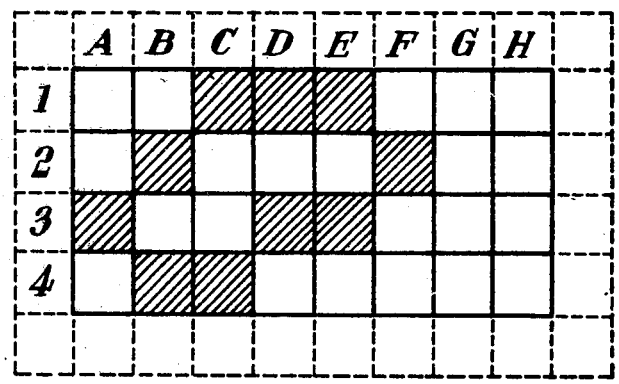
FIG. 1 (referred to above) shows schematically nine dot positions.
FIG. 2 shows schematically a boundary defined on a field of dot positions.

In general, a boundary line drawn on a matrix of rectangles can be better represented if one permits the use of any eight-connected path of rectangles than if one is restricted to four-connected paths. For example, the boundary might pass, in FIG. 1, from position 7 to position 5 without entering positions 4 or 8. The corollary of this is that if one wishes to represent a boundary by a plurality of rectangular dot positions, it is better to allow the boundary to be an eight-connected path.

A method of filling in an area defined by a boundary of eight-connected dot positions will now be considered. The boundary is assumed to lie in a field of dot positions.

If one takes a so-called "seed position" in the field, which position may be inside or outside the boundary, one can then examine each position of the field in turn and determine whether there is a four-connected path from that position to the seed position which path does not include a boundary position. If such a path exists, one can conclude that the position under consideration is within the boundary if the seed position is within the boundary and outside the boundary if the seed position is outside the boundary. If the boundary is defined as closed if eight-connected, one need only look for four-connected paths. Two eight-connected paths may cross without sharing a dot position whereas it is not possible for a four-connected path to cross an eight-connected boundary without sharing a dot position with the boundary. However, if the boundary were defined as being closed only if four-connected, one would need to check for any eight-connected paths, so as to locate eight-connected "holes" in the boundary.

Having determined all points of the field which are four-connected to the seed point, by paths excluding boundary points, one is then, clearly, in a position to fill in the dot positions enclosed by the boundary. The dot positions within the boundary either will be those found by the method (if the seed position lies within the boundary) or where the seed point is outside the boundary will be ascertainable by subtraction of those dot positions found by the method and the boundary positions from the total number of field positions.

The method described will always work for a seed position within the boundary. Where a single seed point is placed outside the boundary, the method will only work where the boundary does not extend to the edge of the field at two or more non-adjacent positions. This will be explained further with reference to FIG. 2 which shows a field of dot positions A1 to H4. An eight-connected boundary is shown by shading. The problem is to identify dot positions within the boundary using a seed position outside the boundary e.g. point G3. By applying the method, four-connected paths not including boundary dots may be established from G3 to each of the following dot positions only. F1, G1, H1, G2, H2, F3, H3, D4, E4, F4, G4 and H4. One might therefore conclude by subtraction that not only dot positions C2, D2, E2, B3 and C3 were within the boundary, but also dot positions A1, B1, A2 and A4. One way of overcoming this problem would be to select several seed positions, one in each separate field area defined externally of the boundary. One could then determine, for each seed point, those dot positions lying within the boundary or in areas external of the boundary but not four-connectable to that seed point. The desired dot positions within the boundary could then be determined by a logic AND function. However, this is unnecessarily complicated. A better method is to regard a notional field boundary, shown in dotted lines in FIG. 2, as consisting entirely of seed points. One then considers, for each dot position of the field, whether a four-connected path not including boundary points exists between that dot position and any of the seed points. In this way, all dot positions external of the boundary can be determined.

The above-described method is applicable to the problem of filling areas in a raster scan graphical display which is refreshed from a frame buffer. The requirement for filling areas arises from a desire to produce zones of continuous colour in a colour graphical display simply by defining the boundary (e.g. a polygon) containing the area. However, the technique is not restricted to colour displays.

The apparatus will utilise, besides the frame buffer or pixel store, two further bit stores of resolution equal to that of the frame buffer (although actually it is possible to use one of these stores as the frame buffer). The frame buffer contains data for output to a raster scan display monitor. Of the two further stores, one is designated the polygon store and the other the fill store. The polygon store is loaded with data representing the boundary to be filled. This is achieved by setting various bits pertaining to boundary dot positions under the control of a graphical vector generator.

Once the boundary is "drawn" in the polygon store, the filling process is commenced. The fill store is cleared and dot positions are then scanned in both the polygon store and the fill store simultaneously. The fill store progressively has all bits set which are not boundary points and which represent points found to be four-connected to a seed point or seed layer by paths not including boundary points. Having thus produced in the fill store a map of bits which represent dot positions, either inside or outside the boundary defined in the polygon store, a copying process is initiated to transfer data representing dot positions within the boundary to the frame buffer for display.

One method of carrying out the scanning process in the polygon and fill stores is carred out as follows. Data representing the dot position is scanned in a manner such that each and every dot position is examined in turn starting from the dot position at the upper left of the display, working horizontally to the upper right, then working right from the leftmost dot position on the next lower row of horizontal dot positions, and so on until the dot position at the lower right is reached. Scanning is then carried out in a manner which may be understood by imagining the display to be rotated by 180° about the diagonal extending from the bottom left corner to the top right corner of the display and scanning horizontally as before until the new lower right corner is reached. The display is then again notionally rotated by 180° and the process recommenced. This entire examination from upper left to lower right and then returning to upper left is called one "scan".

The following describes the manner of operation using a notional seed layer shown dotted in FIG. 2.

As the scan proceeds, each dot position is examined in turn to determine whether or not there exists a four-connected path not including a boundary point from that position to the seed layer. The manner in which this is achieved will be described with reference to FIG. 2. First position A1 is examined. Since it is adjacent two positions of the seed layer, it is clearly four-connected to the seed layer, and since A1 is not set in the polygon store, it is set in the fill store. B1 is then examined. Not only is B1 adjacent a seed position, but it is also adjacent A2 which has been loaded into the fill store already. Therefore, even if B1 were not adjacent the seed layer, it would be loaded into the fill store by virtue of its being located adjacent a position, A1, which has already been loaded into the fill store. The scan then proceeds to C1. Although C1 is adjacent both B1 and the seed layer, it is not loaded into the fill store because it is found in the polygon store. Similarly, D1 and E1 are not set in the fill store. F1 is set in the fill store by virtue of its being adjacent the seed layer, and G1 and H1 are also similarly set. The scanning process then proceeds to the second line and loads A2 into the fill store. B2 is not loaded because it is present in the polygon store. As regards C2, which is internal of the boundary, since neither C1 or B2 have been set in the fill store, the apparatus concludes that C2 might be within a closed boundry and therefore does not set C2 in the fill store. This is not however conclusive proof that C2 is within a closed boundary as may be seen by imagining the situation where, for example, position F2 is not a boundary point, so that the boundary is not closed. It will become apparent that the scanning procedure is capable of detecting this. This will be described later. As scanning proceeds, positions D2 and E2 are not loaded into the fill store since they are treated like position C2. F2 is not loaded because it is a boundary point, but G2 and H2 are loaded into the fill store because they are adjacent positions G1 and H1 respectively which are already loaded. Continuing in this way, positions G3, H3, A4, and D4 to H4 will be loaded into the fill store. Position F3 is not set, however, because the dot positions above and to the left, i.e. positions F2 and E3, are both not set in the fill store. This completes half of one scan. The scanning path then returns by moving vertically in FIG. 2 as already explained. In this part of the scan, dot positions to the right and below each position under examination are looked for in the fill store. As has been explained, all the dot positions external of the boundary positions except position F3 have already been set. F3 is set in this second half of the scan by virtue of its being adjacent dot positions G3 and F4 already set in the fill store. In fact, the presence of only one of positions G3 and F4 in the fill store would be sufficient to cause F3 to be set in this second half of the scan. A further scan will then be initiated. In this further scan, no further dot positions will be set in the fill store, and this is taken to mean that filling is complete. It will be apparent that the scanning method is finite i.e. a situation will always be reached where one complete scan produces no further filling. For further clarification of the method, the situation will now be considered where position F2 is not a boundary point. It will therefore be set in the first half of the initial scan by virtue of its being adjacent position F1. Thus, when the return scanning process reaches position E2, this position is set because the adjacent position F2 is found to be set in the fill store. Subsequently positions D2 and C2 are set. It should be noted that position C3 will not be set since neither D3 or C4 is set in the fill store. Thus position B3 is not set either during the first scan. On completion of the first scan, a further scan is initiated. Position B3 will not be set in the first half of the second scan since neither B2 or A3 are set in the fill store. However, position C3 will be set beacuse it is below position C2 which was set on the previous scan. Therefore, during the second, return half of the second scan, position B3 is set by virtue of its having position C3 on its right. It will thus be seen that a single "hole" at F2 is sufficient to cause all positions to be loaded into the fill store except the boundary points. Similarly, the method can cater for any combination of dots considered to be boundary points. The dots do not need to be connected, there can be any number of closed polygons, (within display limits), parts of a polygon boundary can overlap or cross other parts or a boundary of another polygon, and a boundary may be open i.e. a polygon may "degenerate" into a line. The method is capable of detecting the fact that a boundary is not closed and of loading the fill store accordingly.

During each scan, a flag is kept of those dot positions which contain boundary dots and also a flag is kept of those dot positions marked as being connected to the notional seed layer. If desired a count may be kept of the number of dot positions marked, for example for area measurement. Scanning continues until one complete scan is made during which no further dot positions were set in the fill store. The apparatus then assumes that loading of the fill store is complete. By then reading out into the frame buffer those dot positions which are not set in the fill store or in the polygon store, filling of closed boundaries may be achieved.

Thus the method described does not require placing of a seed point, and it identifies those dot positions which are totally enclosed by a boundary by first identifying those dot positions which are not totally enclosed i.e. exterior dot positions. The interior dot positions to be filled are found by a subtraction process.

This method of proceeding may be called "outfill mode".

Although the described method does not require the placing (e.g. manually) of a seed point, it does not exclude this possibility. An operation mode is possible, so-called in-fill mode, in which before filling takes place, one or more dot positions in the display (excluding boundary dot positions) are identified as seed points by some agency (human or otherwise) external of the apparatus. Scanning then takes place as before to determine the four-connected paths. This mode of operation therefore does not make use of the notional seed layer surrounding the display. Infill mode is particularly useful where the boundary positions define a first closed polygon lying completely within another closed polygon. Using outfill mode, all dot positions within the outer polygon would be identified as "interior" dot positions. Using Infill mode, with a seed point placed within the inner polygon those dot positions within the inner polygon may be identified directly whilst with a seed point placed within the outer polygon but external of the inner polygon, those dot positions within the outer polygon but external of the inner polygon can be identified.

In each method described, the scanning process to establish four-connected paths has been assumed to operate by examining for each dot position two adjacent dot positions with which the examined position is four-connected. If either or both of the adjacent positions either is, or is four-connected to, a seed point, the examined position is marked as four-connected to the seed point or layer. However, in general, the filling process could be speeded up by considering also some or all of the other adjacent dot positions which are eight-connected to the examined position to establish both (a) if any of these dot positions has a four-connected path to a seed point and (b) if there is a four-connected path between the dot position and the examined dot position. This tends to speed up the propagation of four-connected paths.

The method described above involves a reverse scan in which one commences in the bottom right-hand corner, scanning from bottom to top and moving gradually leftwards. It is equally possible to employ a reverse scan in which, again commencing from the bottom right, one scans from right to left, moving gradually upwards: in other words, retracing the path of the forward scan. Although for certain boundary shapes this can result in a slightly slower fill, it permits a certain simplification of the store organisation. This latter method is thus employed in the apparatus now to be described.

Figure 3:
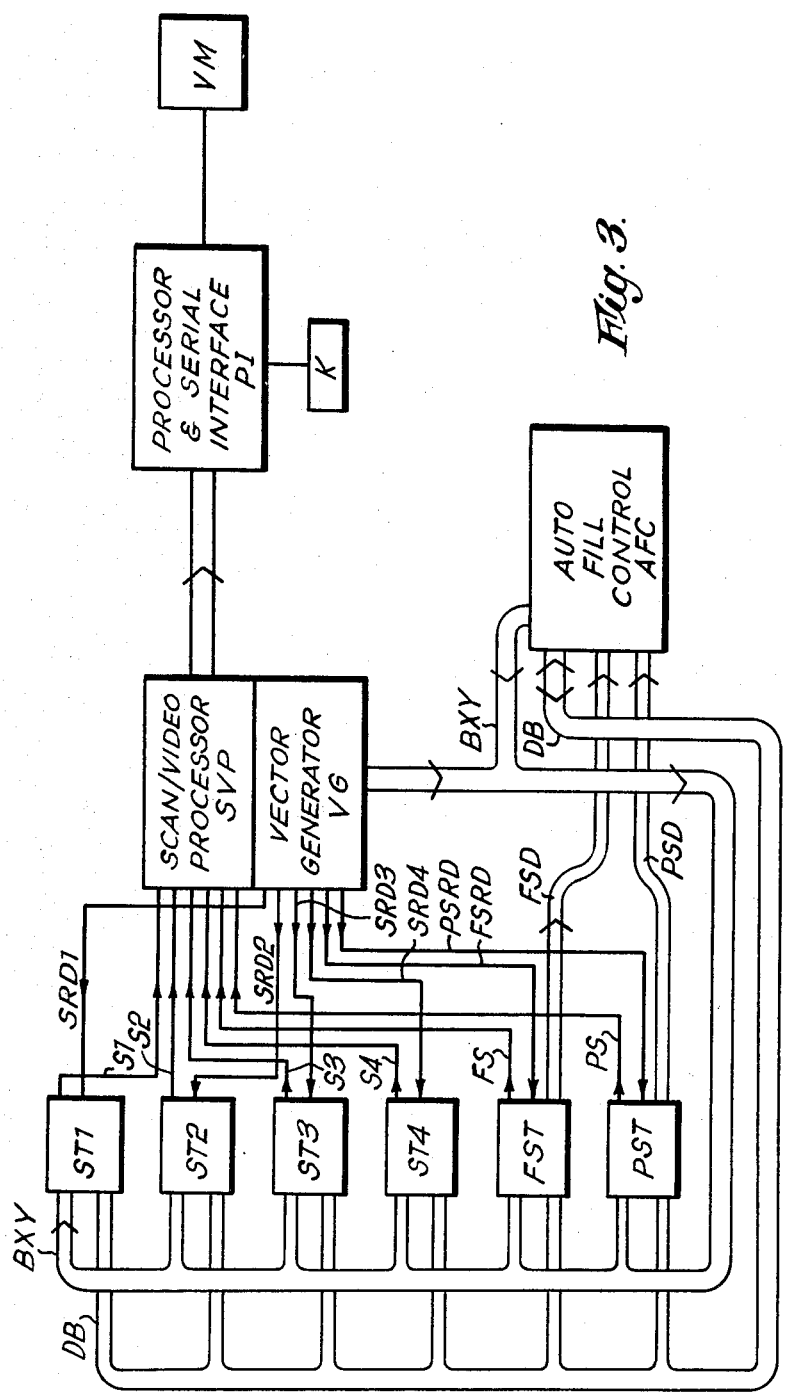
FIG. 3 is a block diagram of a raster-scan display generator according to the invention.

FIG. 3 shows a block diagram of a raster-scan display generator incorporating an area-fill facility.

The generator has four picture element stores ("pixel stores") ST1-ST4 each of which has a capacity of (e.g.) 256K bits (1K=1024) for a 512×512 element graphic display or 384K bits for a 768×512 display. Obviously the display resolution is selected as required for any particular application. The following description assumes a 768×512 display.

Assume for the present that the storage locations of the pixel store ST1 already contain data representing a graphic pattern which is to be displayed. A scan/video processor SVP generates various pulses which are used to clock counters in the pixel store ST1 to read out data sequentially from the store. The serial data are fed via a line S1 to the processor SVP and, after further processing, are fed, along with line and field synchronising pulses to the interface section of a processor and interface unit PI, from which a composite video signal is fed to a video monitor VM.

The pixel stores ST2, 3, 4 operate in the same fashion, and provide further sets of data, the data from the four stores being processed together in the scan/video processor SVP. The contents of the stores ST may be thought of as "planes" of graphic data which can be overlaid to form a composite display—for example three planes (red, green, blue) for a full colour display and/or other facilities such as a flashing display, or may serve for several video monitors with different displays simultaneously.

As well as the sequential readout referred to above, the pixel stores can be supplied with an external address via an address bus BXY for input and output of data via a data bus DB (24 bit data) or input via a line SRD1-SRD4 (single bit). For clarity, the necessary interconnections between the various units, for carrying timing and control signals, are not shown in FIG. 3.

Entry of graphic data into the pixel stores, or modification of such data is effected from a keyboard or keypad K, or other input source, with the aid of a vector generator VG, via the lines SRD1-4.

The manner in which data representing lines, circles, other patterns, or alpha-numeric data is thus entered into the pixel stores accessed via the data and address buses DB, BXY is conventional and is not directly relevant to the present invention; in the description which follows, it will therefore be referred to only briefly.

The area fill facility is provided by means of two further pixel stores, the fill store FST and the polygon store PST. The function of the polygon store PST is, as previously explained, to store data representing a boundary line. The fill store FST is for storing data representing dot positions within (or outside) a closed boundary defined by data stored in the polygon store PST. These are of similar construction to the pixel stores ST1-4, and indeed all these stores may be identical. Graphic data can be entered into FST and PST via lines FSRD, PSRD in exactly the same way as the other pixel stores although normally, of course, data other than seed points will be entered into the fill store only by the area fill system. In the described embodiment, the fill and polygon stores FST, PST have address counters, and serial data outputs FS, PS, so that their contents can be "mapped" onto the screen of the monitor VM just like the other stores or planes, although this is not essential since the contents of one pixel store can be transferred to another. It should perhaps be noted that where the fill and/or polygon stores are capable of direct display, the others ST1-ST4 could be omitted, so that a minimum system (with correspondingly limited facilities) would need only two pixel stores.

Those parts of the apparatus which participate in the area fill will now be described in greater detail. It should be noted that many items such as counters, data selectors and latches are represented as single units, but they may well consist of a number of individual integrated circuits—e,g, a 24 bit latch may consist of three 8-bit latches. Attainment of the operating speeds referred to can be achieved by the use of Schottky TTL integrated circuits (e.g. 74S and 74LS series) where appropriate.

Figure 4:
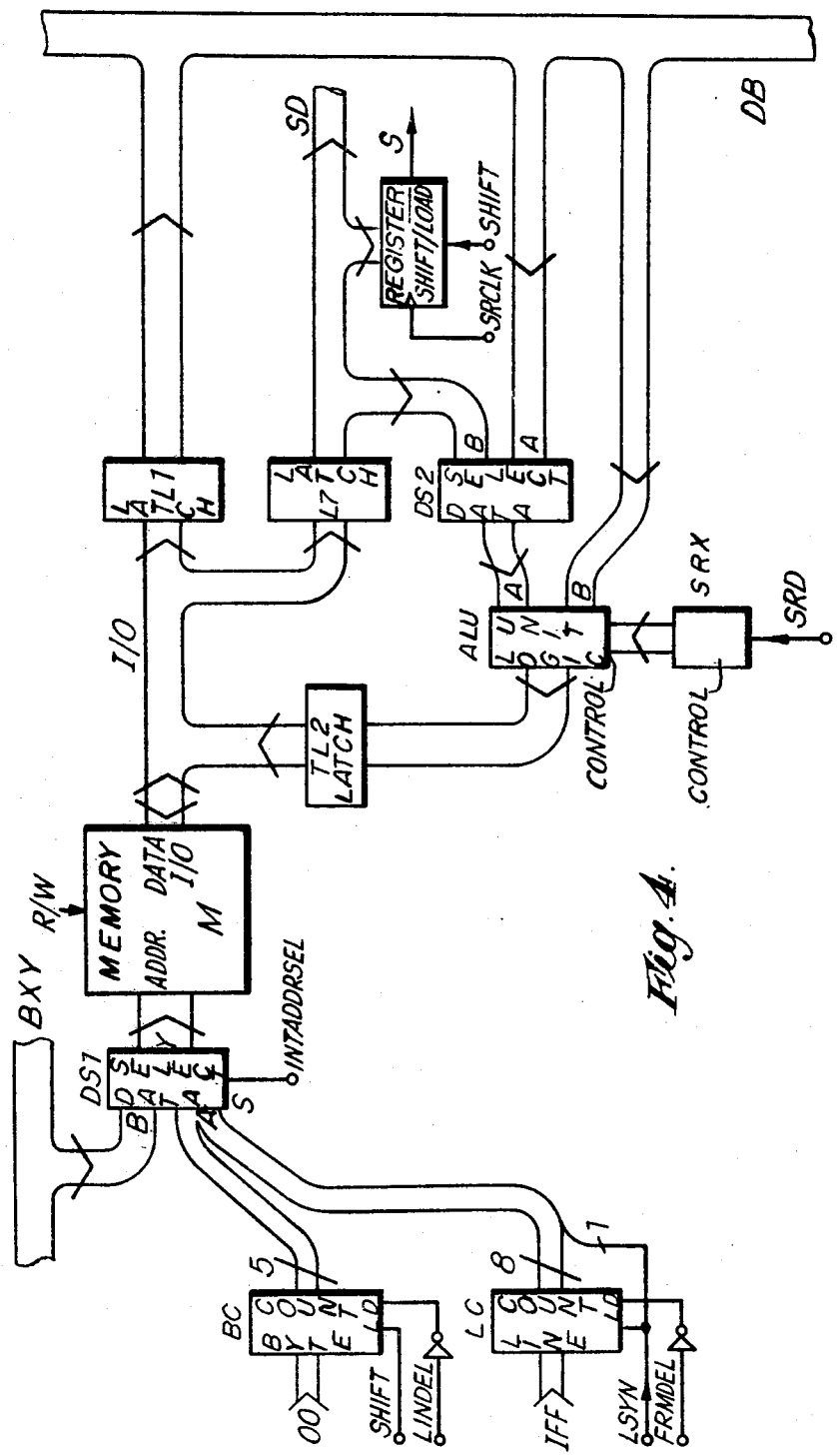
FIG. 4 is a block diagram of a pixel store of the apparatus of FIG. 3.

Reference will first be made to FIG. 4 which is a block diagram of a pixel store for use as the fill store FST, polygon store PST or other store ST of FIG. 3. The data storage is provided by a semiconductor memory M with its 384K bit capacity organised as 16K bytes of 24 bits each, which may conveniently comprise twenty-four 16K dynamic memory integrated circuits ("RAM chips") type 4116, along with suitable row-and column-address latches; refreshing of the dynamic memory is carried out in conventional manner by the scan/video processor SVP. The required 14-bit memory address is obtained via a bank of 2-to-1 line data selectors DS1 (under control of a selection signal INTADDRESEL from SVP) either externally from the address bus BXY, or during a display scan, internally from the byte and line counters BC, LC referred to above, which count, respectively, byte rate pulses SHIFT and line rate pulses LSYN from the scan/video processing unit SVP. The byte counter BC is preset to 0 by pulses LINDEL occurring at the beginning of each line scan and the line counter is set to 511 by pulses FRMDEL at the beginning of each frame scan. Again, FRMDEL and LINDEL are generated by the unit SVP. The unit SVP exercises a supervisory function in respect of the pixel stores; access to the stores being allowed on a priority basis: display scan (highest priority); dynamic memory refresh; vector generator access; area fill.

The data input/output lines I/O from the memory M are connected to the inputs of a first 24-bit data latch TL1 which has tristate outputs for supplying data to the data bus DB. A second data latch L1 supplies data to a 24-bit shift register SR1 which is loaded under control of the above-mentioned SHIFT pulses. The aforementioned serial data S are clocked out of this shift register SR1 by dot-rate pulses SRCLK. The output of the latch L1 is also available externally (at SD), in the case of the polygon and fill stores, for the area fill control AFC. This output is redundant in the case of the pixel stores ST1-4.

Input to the memory is from a 24-bit latch TL2 whose tristate output feeds the input/output terminals I/O of the memory and whose input is fed with external data from the data bus DB and latched store output data from the latch L1 via a data selector DS2 and an arithmetic logic unit ALU. For a data bus write—e.g. copying from another pixel store, data can pass unhindered from the data bus DB to the input latch TL2: alternatively the ALU can be controlled to provide various logic functions—e.g. an AND of the bus data and existing store data. Input of individual bits from the vector generator VG and line SRD is effected via a control unit SRX connected to the ALU, along with CAS (column address strobe) control means (not shown) which selects the appropriate one of the 24 RAM chips forming the memory M.

Figure 5:
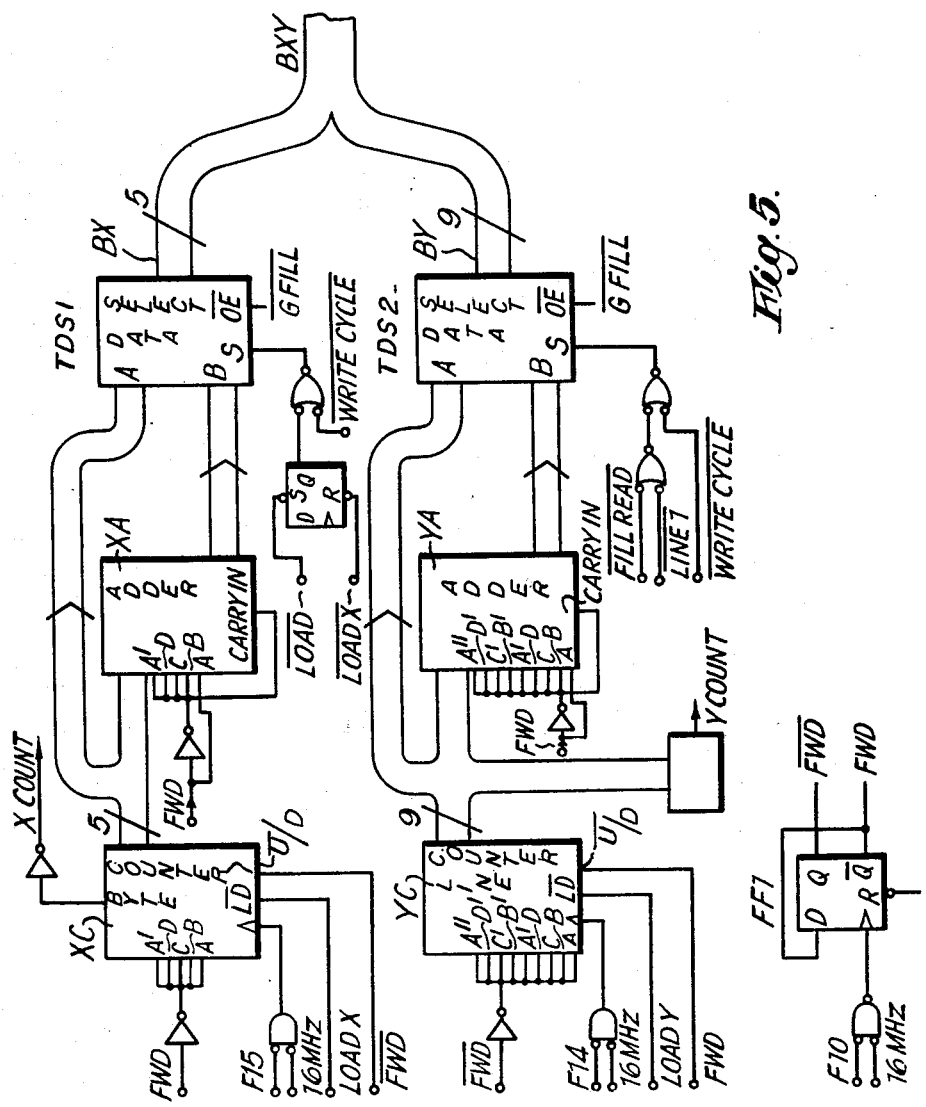
FIGS. 5 and 6 are a block diagram of the area fill control unit of the apparatus of FIG. 3.
Figure 6:
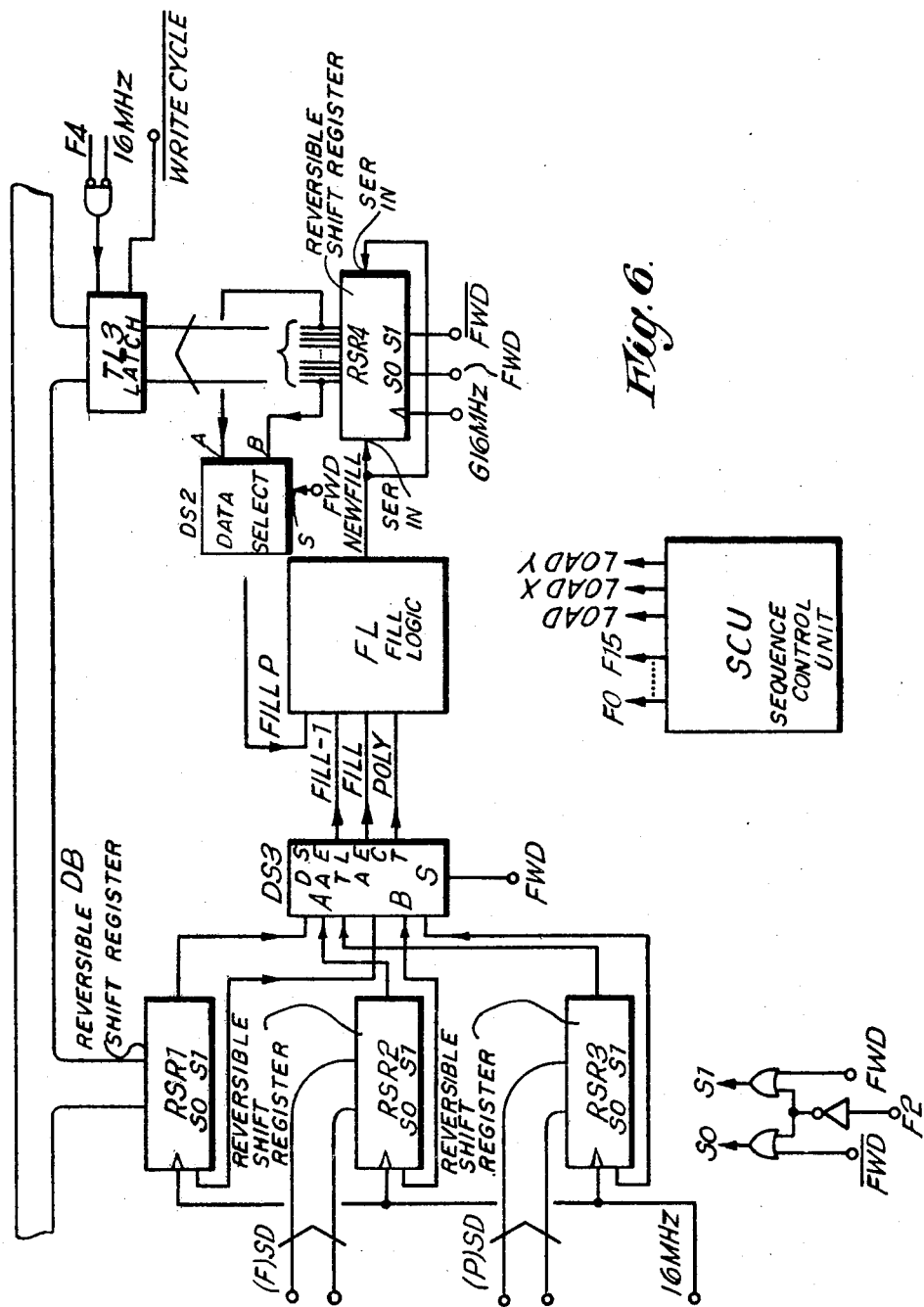

The automatic fill controller AFC is shown in FIGS. 5 and 6, its functioning being to perform scanning operations to determine the four-connected paths not including boundary points as previously explained. The polygon store PST and the fill store FST are scanned simultaneously. When one complete scan has been completed in which no further bits were set in the fill store, the fill process is complete, and the contents of the fill and polygon stores can be directly displayed, transferred to one or more of the pixel planes ST1-ST4, or otherwise processed under control of the scan/video processor SVP and/or processor PI. Although it would be quite possible to carry out the area fill operation using a suitably programmed microprocessor, in the interests of speed the embodiment of the invention described here employs hardware area fill circuitry.

The unit is controlled by a 16 MHz clock generator (not shown) whose output pulses are designated "16 MHz" or, in inverted form, "$\overline{16\ MHz}$". Control of area fill operation is carried out by a sequence control unit SCU (FIG. 6), to be described below, which produces sixteen outputs F0-F15 which define a micro-program for the area fill sequence.

It will be recalled that in the first half of its scan, (forward scan) the controller must examine dot (i.e. memory) locations in turn, passing from left to right, down the "image", as when reading a printed page. The organisation of the memory is such that each byte represents 24 consecutive dots of a line, and 16 consecutive bytes in the store represent one line (i.e. 768 dots) of the graphic pattern represented by the contents of the memory. There are 512 such lines. The address which the controller AFC puts on the bus to access the fill and/or polygon store thus comprises a 5-bit horizontal address BX and a 9-bit vertical address BY. The BX address is obtained from a byte counter XC incremented at $16/24 = \frac{2}{3}$ MHz by a control signal F15 from the sequence control unit SCU (described below). The BY address is obtained by decrementing a line counter YC (control signal F14).

During the reverse scan, one starts at the memory location corresponding to the bottom right-hand corner of the display and moves leftward, and then proceeds to the next line above, so that the y counter YC must be incremented, whilst the x counter must be decremented. In order to reverse the direction of count of the counters XC and YC, the count direction is controlled by a signal FWD from a forward/reverse scan flip-flop FF1, controlled by F10.

Initialisation of the counters for the correct starting positions is achieved by signals LOADX, LOADY which are generated by the sequence control unit at the beginning of each line or frame respectively and serve to preset the counters to zero or to maximum count according to the count direction and hence the state of FWD which is supplied to the preset inputs of the counters.

In order to speed up the filling process, the timing of the address counters is arranged so that while each set of data is processed, the next set is being accessed in readiness. Thus, when writing processed data into the fill store, the write address is, in the forward count direction, one less than the current address and, in the reverse direction, one greater. Thus the outputs from the x address counter XC are routed to one set of inputs of a data selector TDS1, whilst the other set of inputs to the data selector is connected to an adder XA. When counting in the forward direction the adder adds 1E+carry=1F, i.e. subtracts 1 from the X address, whilst in the reverse direction it adds 1. Since both the y count and the y count+1 (or −1) are required for reading out fill data for the current line (FILL) and the preceding line (FILL-1), the y changeover is effected by a signal FILL READ (low for FILL, high for FILL-1) derived from the outputs F0-F15 of the sequence controller SCU.

The y addressing is performed in a similar manner, except that a forward scan implies reverse operation of the counter YC and vice versa, the adder YA adding 1 or 1FE+carry=1FF respectively. An overflow or underflow on either counter is signalled to the sequence control to indicate completion of the relevant line or frame (signals XCOUNT YCOUNT). The data selectors TDS1, TDS2 have tristate outputs for driving the address bus BXY, and are enabled by a signal GFILL from the processor interface unit PI.

The decision for any particular dot location, on whether or not a dot is to be written into the fill store requires, as has been seen, the following information (alternatives in square brackets refer to reverse scan):
Fill data on the location above [below]
Fill data on the location to the left [right]
Polygon data on the location in question.
Seed data (for auto-fill)
Are we at the top [bottom]?
Are we at the left [right]?

In the case of seed-fill, it is assumed that a seed point has been placed in the fill store by the user or some other part of the equipment.

Fill data (FILL-1) from the preceding line are obtained from the fill store via the data bus DB, and loaded, one byte at a time, into a reversible shift register RSR1. (FIG. 6) Fill data (FILL) for the current line are obtained from the fill store via a connection (F)SD, and polygon data (POLY) on the current position are obtained from the polygon store via connection (P)SD. FILL and POLY data are similarly loaded into further reversible shift registers RSR2, RSR3. Data is fed serially from the three shift registers using clock signals 16 MHz, to fill logic FL. The shift direction is determined by the signals FWD, $\overline{\text{FWD}}$ which also control a data selector DS3 to select the right or left serial outputs.

Figure 7:
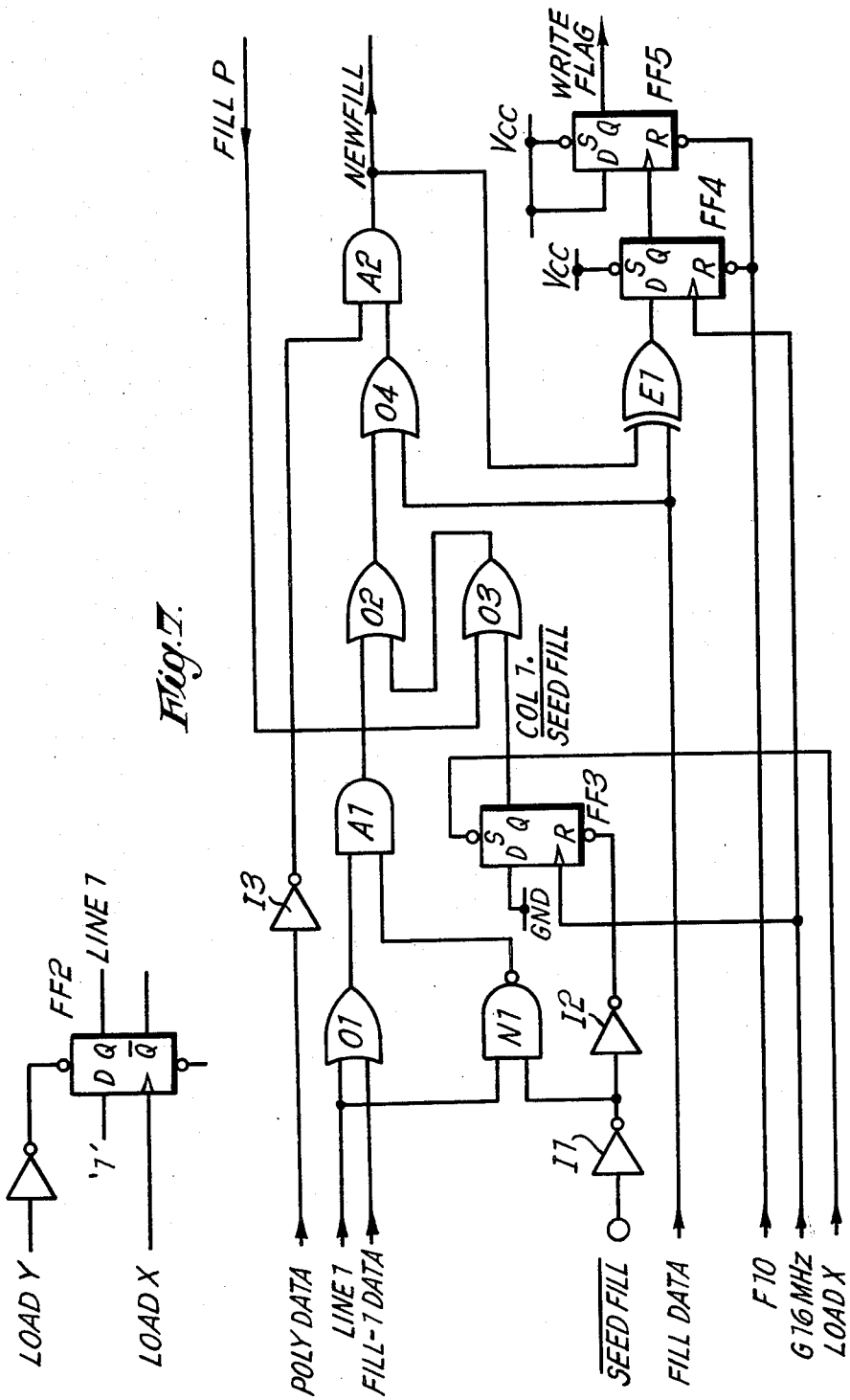
FIG. 7 is a circuit diagram of the fill logic FL of FIG. 5.

The fill logic is shown in FIG. 7 and is fed, in addition to the serial data, FILL-1, FILL and POLY, with signals FILL$^P$—data corresponding to preceding location in fill store $\overline{\text{SEED FILL}}$—is set (by SVP) to logic 1 if auto-fill is required.

G 16MHz ⎫ from the sequence control unit SCU.
$\overline{\text{LOADX}}$ ⎬ G 16MHz is the same as 16 MHz except that it occurs only
$\overline{\text{LOADY}}$ ⎭ during the twenty-four clock periods starting from the beginning of F2.

The fill logic comprises OR gates 01 to 04, a NAND gate N1, AND gates A1, A2, inverters, I1, I2 and I3, an EXCLUSIVE-OR gate E1, and four D-type positive edge-triggered flip-flops FF2, FF3 FF4 and FF5. FF2 is set at the beginning of each frame scan by $\overline{\text{LOADX}}$ and reset at the end of the first line by $\overline{\text{LOADY}}$, so that its output (LINE 1) is at logic 1 only during the first line of any scan. If $\overline{\text{SEEDFILL}} = 0$ flip-flop FF3 is held in the reset state, so that its output (designated COL1. $\overline{\text{SEEDFILL}}$) is logic 0. Also the NAND gate N1 is enabled so that when LINE 1=1 neither LINE 1 or FILL-1 can pass the AND gate A1. If $\overline{\text{SEEDFILL}} = 1$, flipflop FFe3 is set at the beginning of each line by $\overline{\text{LOADX}} = 0$, and is reset one dot period later by G16 MHz supplied to the clock input of the flip-flop. COL1. $\overline{\text{SEEDFILL}}$ thus assumes logic 1 when the current dot position is at the left hand side [right hand] just as LINE1 is 1 when the current position is at the top [bottom].

The output of A1 is thus $\overline{\text{LINE 1. SEEDFILL}}$. (LINE1 + FILL-1) = LINE1.
$\overline{\text{SEEDFILL}}$ + LINE1. $\overline{\text{SEEDFILL}}$. FILL-1

The OR gates 03, 04, 05 effectively form a 4-input OR gating receiving A1, COL1. $\overline{\text{SEEDFILL}}$, FILL and FILLP, and whose output is fed to the AND gate A2 whose other output is fed via the inverter 13 with POLY.

The output of A2 is thus

NEWFILL = $\overline{\text{POLY}}$. (COL1. $\overline{\text{SEEDFILL}}$ + LINE 1. $\overline{\text{SEEDFILL}}$ + LINE 1. $\overline{\text{SEEDFILL}}$. FILL-1 + FILL + FILLP)

and indicates whether or not the current fill store location is to be—i.e. this location is set (logic 1), provided that it is not a boundary point ($\overline{\text{POLY}} = 0$), if it is already set (FILL), or the preceding location (FILLP) is set, or the location on the adjacent line (FILL-1) is set, or (for auto-fill only) it lies adjacent the field boundary.

Referring again to FIG. 6, the serial NEWFILL data from the fill logic FL are loaded serially into a further 24 bit bidirectional shift register RSR4, whose count direction is again controlled by FWD. When the shift register RSR4 is full, its contents are written into the fill store FS via a tristate-output latch TL3 and the data bus DB. It will be appreciated that the input-end stage of the shift register holds the last NEWFILL entered, and the output of this stage (selected according to direction via a data selector DS2) is returned to the fill logic FL as the signal FILLP referred to above.

Returning to FIG. 7 the EXCLUSIVE-OR gate E1 compares FILL and NEWFILL and, if, for any location, they are different, the flip-flop FF4 is set synchronously with G16 MHz. If FF4 has been set during a scan, the 1 to 0 transition at its output sets the flip flop FF5 generating a signal WRITEFLAG = 1, which is passed to the sequence control unit SCU to indicate that at least one write into the fill store FST has occurred. At the end of each reverse scan, a control signal F10 from the sequence control SCU resets FF4 and FF5.

Figure 8:
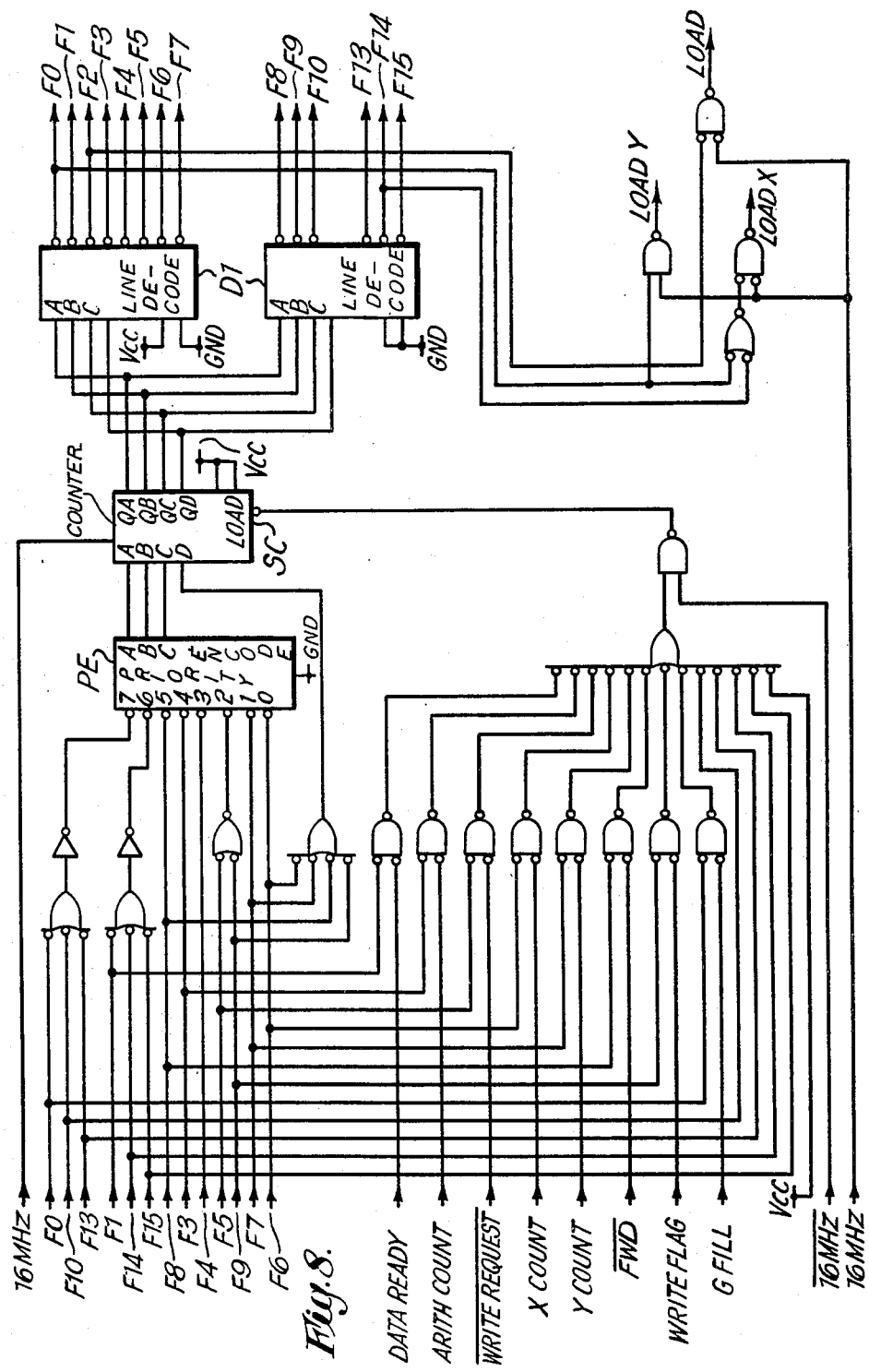
FIG. 8 is a circuit diagram of the sequence control unit SCU of FIG. 5.

The sequence control unit SCU is shown in FIG. 8. Essentially the control unit comprises a four bit binary counter SC clocked by 16 MHz, the output of which is decoded by a 4-to-16 line decoder D1 to produce sixteen sequential phase outputs F00-F15 which define a micro program for the area fill sequence. The counter may be set by means of a priority encoder PE allowing the control sequence to follow pre defined microprogram loops. These jumps are conditional, dependent on inputs:

DATA READY—from the scan/video processing unit SVP indicating that the pixel stores required are available to the area fill system.

ARITH COUNT—An arithmetic counter AC defines a period of 24 clock periods following the start of phase F2, during which it enables the passage of the pulses G16 MHz. The end of this period is signalled by ARITH COUNT = 1.

$\overline{\text{WRITE REQUEST}}$ ⎫
X COUNT ⎬ from FIG. 5
Y COUNT ⎪
$\overline{\text{FWD}}$ ⎭

WRITE FLAG: from FIG. 7
GFILL

The sequence of events during a fill will, in general terms, have been gathered from the preceding description. In the table below, the signals occurring, the events taking place, and the decisions to be made, are now summarised:

| Sequence Controller Phase | Signals, JUMPS | |
|---|---|---|
| F0 | LOADX = 1 | Set x and y counters XC,YC (FIG. 6) according to scan direction. Request to SVP for pixel store access. Reset "ready" flip-flop (not shown) |
| | LOADY = 1 | |
| | IF JUMP = 0 jump to F0 | JUMP is a flag which is set by SVP to commence area fill |
| F1 | IF DATA READY = 1 jump to F1 | wait until SVP has indicated pixel store availability by setting the "ready" flip-flop |
| F2 | LOAD | load data into shift registers RSR1,2,3 Reset "ready" flip-flop. Request data with x + 1 |
| F3 | IF ARITH COUNT = 1 jump to F3 | wait until end of 24 clock-period delay |
| F4 | IF WRITE CYCLE NOT AVAILABLE, jump to F4 | wait until stores are free again for Write |
| F5 | Request write cycle | write new data into fill store Reset write available flag |
| F6 | If XCOUNT = 1 jump to F14 | chech whether current line/frame is completed |
| F7 | If YCOUNT = 1 jump to F15 | |
| F8 | If FWD = 1 jump to F10 | check write flag only at end of reverse scan |
| F9 | If WRITE FLAG = 0 jump to F13 | no write, so exit |
| F10 | Change FWD flag Switch FF1 over for next frame reset write flag and repeat jump to F0 | |
| F11 | — | |
| F12 | — | |
| F13 | Reset & jump to F0 | |
| F14 | LOADX jump to F1 | increment y counter YC. Load x counter XC again Request data, reset "ready" Go round again |
| F15 | jump to F1 | Increment x counter XC Go round again |

I claim:

1. A raster-scan display apparatus comprising: first store means having a plurality of memory locations for storing data representing respective dot positions of a display field; means operable to store in said store data representing boundary dot positions; second store means having a plurality of memory locations for storing data representing respective dot positions of the display field; means operable to define one or more notional dot positions in or adjacent the field as representing a seed point or points; and classifying means arranged in operation, for each dot position of the display field, to determine whether there exists, from that dot position to the or a seed point, a connected path of dot positions which does not include a dot position which is indicated by the corresponding location in said first store means as being a boundary dot position and, if such a path exists, to set the corresponding location in the second store means.

2. An apparatus according to claim 1 in which the means for defining the seed point(s) comprises means operable to set one or more locations in said second store means.

3. An apparatus according to claim 1 in which the means for defining the seed point(s) comprises means operable to supply a signal indicating that all points adjacent the edge of the field are to be taken to be connected to a seed point.

4. An apparatus according to claim 1, 2 or 3 in which the classifying means is arranged to carry out a scan of the field in which, for each dot position of the field the corresponding location in the second store means is set only if the position in question (a) is not a boundary point and (b) is adjacent to, and connected to a seed point or to another point in respect of which the corresponding location in the second store means has been set, and to carry out further such scans until a scan has taken place in which no locations have been set in the second store.

5. An apparatus according to claim 4 in which any eight-connected boundary is defined as closed, and a path is defined as connected only if four-connected, and the classifying means is arranged to carry out each scan in two parts wherein, in each part of the scan, the positions of the field are scanned in turn in a raster-like manner and the corresponding location in the second store is set only if condition (b) is satisfied in respect of those seed or other points which, in the relevant scan directions, precede the point in question, the classifying means including means for reversing the sense of scan in both directions during the second part of the scan.

6. An apparatus according to claim 5 in which the means for defining the seed point(s) comprises means operable to set one or more locations in said second store means and the classifying means comprises addressing means including address counters and arranged in operation during each part of the scan, to read out sequentially in a raster-like manner, data in respect of each dot position, said data comprising:

(a) boundary data consisting of the contents of the corresponding location in the first store means (b) fill data consisting of the contents of the corresponding location in the second store means (c) previous line fill data consisting of the contents of the location in the second store corresponding to the corresponding dot position of the previous line (if any) of the current part of the scan (d) previous dot fill data consisting of the contents of the location in the second store means corresponding to the previous dot position (if any) of the current scan line in which the means for defining the seed points comprises means operable to set one of more locations in said second store means, in which the classifying means further comprises logic means responsive to said data to write into the location in the second store means corresponding to the current dot position data representing the set state only if (a) the boundary data indicates the absence of a boundary point and (b) any one of the fill data, previous line fill data (if any) and previous dot fill data (if any) indicates the set state, and in which the classifying means further comprises bistable means the state of which is changed at the conclusion of each part of the scan and which controls the count direction of the address counters.

7. An apparatus according to claim 6 in which the means for defining the seed point(s) comprises means operable to supply a signal indicating that all points adjacent the edge of the field are to be taken to be connected to a seed point and the classifying means comprises addressing means including address counters and arranged in operation during each part of the scan, to read out sequentially in a raster-like manner, data in respect of each dot position, said data comprising:

(a) boundary data consisting of the contents of the corresponding location in the first store means (b) fill data consisting of the contents of the corresponding location in the second store means (c) previous line fill data consisting of the contents of the location in the second store corresponding to the corresponding dot position of the previous line (if any) of the current part of the scan (d) previous dot fill data consisting of the contents of the location in the second store means corresponding to the previous dot position (if any) of the current scan line, in which the means for defining the seed points is arranged in operation to supply a seed signal whenever the current dot position is (in the current scan direction) the first dot position of the current line of the scan or on the first line of the field, in which the classifying means further comprises logic means responsive to said data to write into the location in the second store means corresponding to the current dot position data representing the set state only if (a) the boundary data indicates the absence of a boundary point and (b) either (i) any one of the fill data, previous line fill data (if any) and previous dot fill data (if any) indicates the set state or (ii) said seed signal is present, and in which the classifying means further comprises bistable means the state of which is changed at the conclusion of each part of the scan and which controls the count direction of the address counters.

8. An apparatus according to claim 6 in which the second store means comprises a store, single-bit locations locations of which correspond to respective dot positions of the field, which is byte-organised, first and second shift registers for parallel to bit-serial conversion of said fill data and previous line fill data respectively, and a third shift register for bit-serial to parallel conversion of the output data, in which the shift direction of the shift registers is controlled by said bistable means, and in which the logic means is connected to receive said previous dot fill data directly from said third register without passing via said store.

9. A method for classifying areas defined by a boundary in a display field of a raster-type display, comprising defining a boundary by means of a plurality of boundary dot positions; identifying at least one seed point; determining, for each dot position of the display field whether there exists, from that position to the or a said seed point, a connected path of dot positions not including a boundary dot position, and if such a path exists recording the position of the dot.

10. A method according to claim 9 including identifying at least one seed point within the display field.

11. A method according to claim 9 in which a continuous boundary of seed points is assumed to exist externally of, and adjacent to, the edges of the display field.

12. A method according to claim 9, 10 or 11 in which said determination comprises carrying out a scan of the field in which each dot position of the field is recorded as being linked by a connected path to a seed point only if the position in question (a) is not a boundary point and (b) is adjacent to, and connected to a seed point or to another point in respect of which such a path has already been recorded as existing, and carrying out further such scans until a scan has taken place in which no further paths have been recorded.

13. A method according to claim 12 in which any eight-connected boundary is defined as closed, and a path is defined as connected only if four-connected, and each scan is carried out in two parts wherein, in each part of the scan, the positions of the field are scanned in turn in a raster-like manner and each dot position is recorded as being so linked only if condition (b) is satisfied in respect of those seed or other points which, in the relevant scan directions, precede the point in question, the sense of the scan in both directions being reversed during the second part of the scan.

14. An apparatus according to claim 7 in which the second store means comprises a store, single-bit locations locations of which correspond to respective dot positions of the field, which is byte-organised, first and second shift registers for parallel to bit-serial conversion of said fill data and previous line fill data respectively, and a third shift register for bit-serial to parallel conversion of the output data, in which the shift direction of the shift registers is controlled by said bistable means, and in which the logic means is connected to receive said previous dot fill data directly from said third register without passing via said store.

* * * * *